(12) United States Patent
Ravela et al.

(10) Patent No.: US 8,625,840 B2
(45) Date of Patent: Jan. 7, 2014

(54) METHOD AND APPARATUS FOR GENERATING A FORECAST WEATHER IMAGE

(75) Inventors: Srinivas Ravela, Belmont, MA (US); William J. Dupree, Westborough, MA (US); Timothy R. Langlois, Tyngsboro, MA (US); Marilyn M. Wolfson, Acton, MA (US); Christopher M. Yang, Norwalk, CT (US)

(73) Assignee: Massachusetts Institute of Technology, Cambridge, MA (US)

(*) Notice: Subject to any disclaimer, the term of this patent is extended or adjusted under 35 U.S.C. 154(b) by 87 days.

(21) Appl. No.: 13/372,646

(22) Filed: Feb. 14, 2012

(65) Prior Publication Data

US 2012/0207343 A1  Aug. 16, 2012

Related U.S. Application Data

(60) Provisional application No. 61/442,892, filed on Feb. 15, 2011.

(51) Int. Cl.
*G06K 9/00* (2006.01)
*G06K 9/62* (2006.01)
*G01W 1/00* (2006.01)

(52) U.S. Cl.
USPC ............... 382/100; 382/215; 382/218; 702/3

(58) Field of Classification Search
USPC ..................... 382/100, 215, 217, 218; 702/3; 73/170.16
See application file for complete search history.

(56) References Cited

U.S. PATENT DOCUMENTS

| | | | |
|---|---|---|---|
| 5,796,611 A | 8/1998 | Ochiai et al. | |
| 5,959,567 A | 9/1999 | Wolfson et al. | |
| 5,974,360 A * | 10/1999 | Otsuka et al. | 702/3 |
| 6,128,578 A * | 10/2000 | Sakaino et al. | 702/3 |
| 6,340,946 B1 * | 1/2002 | Wolfson et al. | 342/26 R |
| 7,062,066 B2 | 6/2006 | Wolfson et al. | |
| 7,542,852 B1 | 6/2009 | Rose et al. | |
| 2003/0156734 A1 * | 8/2003 | Wolfson et al. | 382/100 |
| 2004/0239550 A1 * | 12/2004 | Daly, Jr. | 342/26 B |
| 2007/0005249 A1 * | 1/2007 | Dupree et al. | 702/3 |
| 2009/0224965 A1 * | 9/2009 | Venkatachalam et al. | 342/26 R |

OTHER PUBLICATIONS

Costes et al. "Weather Hazard Interpretation and Forecast by an Airborne Radar." International Radar Conference—Surveillance for a Safer World, Oct. 12, 2009, pp. 1-6.*
Sakaino. "A Unified Prediction Method for Heterogenous Weather Radar Patterns." Proceedings of the Sixth IEEE Workshop on Applications of Computer Vision, 2002, pp. 296-303.*

(Continued)

*Primary Examiner* — Jon Chang
(74) *Attorney, Agent, or Firm* — Schmeiser, Olsen & Watts LLP (57) ABSTRACT

Described are a method and an apparatus for generating a forecast weather image such as a forecast weather radar image. The method uses filters to approximate viscous alignment and to thereby determine displacement fields having meaningful structure. In various embodiments a power-law energy spectrum is utilized for deformations in the displacement field through the application of a set of Gabor filters. The Gabor filters are applied in a sequential manner to gradient error images and values of modes of motions corresponding to the Gabor filters are determined. The values are used to generate the displacement field which can then be applied to an existing weather image to generate a forecast weather image.

26 Claims, 5 Drawing Sheets

(56) References Cited

OTHER PUBLICATIONS

Shinozawa et al. "A Weather Radar Image Prediction Method in Local Parallel Computation." IEEE International Conference on Neural Networks, IEEE World Congress on Computational Intelligence, vol. 7, Jun. 27, 1994, pp. 4210-4215.*

International Search Report and Written Opinion in counterpart international patent application No. PCT/US2012/024945, dated Sep. 26, 2012; 10 pages.

Yang, Christopher M. and Ravela, Sai, "Deformation Invariant Image Matching by Spectrally Controlled Diffeomorphic Alignment", IEEE 12th International Conference on Computer Vision, 2009; 8 pages.

International Preliminary Report on Patentability in related International Patent No. PCT/US2012/024945, mailed on Aug. 29, 2013; 7 pages.

* cited by examiner

METHOD AND APPARATUS FOR GENERATING A FORECAST WEATHER IMAGE

RELATED APPLICATION

This application claims the benefit of the earlier filing date of U.S. Provisional Patent Application Ser. No. 61/442,892, filed Feb. 15, 2011, titled "Methods of Scale-Cascaded Field Alignment," the entirety of which is incorporated herein by reference.

GOVERNMENT RIGHTS IN THE INVENTION

This invention was made with government support under Grant No. FA8721-05-C-0002 awarded by the Federal Aviation Administration and under Grant No. NSF DBI 0640529 awarded by the National Science Foundation. The government has certain rights in this invention.

FIELD OF THE INVENTION

The present invention relates generally to the processing of weather radar images for generating forecast weather images. More particularly, the invention relates to a method of generating a forecast weather image that uses a cascaded field alignment technique.

BACKGROUND OF THE INVENTION

Short term and mid-range weather predictions (e.g., 30 minutes to several hours) of the location of organized storms and other weather features are extremely important to many sectors of the population. For example, aviation systems, traffic information systems, power companies and commuters realize important safety and economic benefits from accurate predictions of organized storms.

Cross-correlation image processing has been applied to weather radar images to generate short term forecast images. For example, a method for predicting the motion of an organized storm is disclosed in U.S. Pat. No. 5,959,567, incorporated by reference herein. The method is based on applying an image filter matched to the structure of an organized storm to weather radar images at different times to thereby generate filtered weather radar images. An image tracker performs a cross-correlation of the filtered images to generate an array of track vectors that represents the movement of weather features, such as organized storms, in the time interval between the images. The track vectors are applied to a weather radar image to advect meteorological features and thereby generate a forecast image for a future time.

The method based on cross-correlation image processing does not have constraints imposed on the track vectors. In some instances, highly discontinuous track vector fields are produced that are contrary to a practical meteorological environment and therefore do not yield accurate forecast images. For example, track vectors at adjacent grid points in the array can cross over each other or point in opposite directions.

SUMMARY

In one aspect, the invention features a method of generating a forecast weather image. The method includes (a) receiving a template weather image and a target weather image for a geographical region, where the template and target weather images include values of a meteorological parameter according to location in the geographical region at a first time and a second time, respectively. The method also includes (b) determining a gradient error based on a difference of the template and target weather images; (c) applying a spectral filter to the determined gradient error to generate a value of a mode of motion corresponding to the spectral filter; and (d) deforming the template weather image according to the value of the mode of motion. Steps (b) through (d) are repeated. Each repetition of step (b) includes determining the gradient error based on a difference of a last deformed template weather image and the target weather image, each repetition of step (c) includes applying a spectral filter having a wavenumber greater than a wavenumber of a last applied spectral filter, and each repetition of step (d) includes deforming the last deformed template weather image. The method further includes determining a displacement field based on the values of the modes of motion.

In another aspect the invention features a method of generating a forecast weather image that includes (a) receiving a template weather image and a target weather image for a geographical region, where the template and target weather images include values of a meteorological parameter according to location in the geographical region at a first time and a second time, respectively. The method also includes (b) determining a gradient error based on a difference of the template and target weather images; (c) applying a spectral filter to the determined gradient error to generate a value of a mode of motion corresponding to the spectral filter; and (d) deforming the template weather image according to the value of the mode of motion. The method further includes the step (e) of repeating steps of (b) through (d) where each repetition of step (b) comprises determining the gradient error based on a difference of a last deformed template weather image and the target weather image and wherein step (d) comprises deforming the last deformed template weather image. The method further includes the step (f) of repeating step (e), wherein each repetition of step (b) according to step (e) comprises determining the gradient error based on a difference of the last deformed weather image and the target weather image, each repetition of step (c) according to step (e) comprises applying a spectral filter having a wavenumber greater than a wavenumber for a last applied spectral filter, and each repetition of step (d) according to step (e) comprises deforming the last deformed template weather image.

In still another aspect the invention features a computer program product for generating a forecast weather image. The computer program product includes a computer-readable storage medium having computer readable program code. The computer readable program code includes program code for executing various steps of the methods described above.

In yet another aspect the invention features an apparatus for generating a weather forecast image. The apparatus includes an input module and a processor module. The input module is configured to acquire and store a template weather image and a target weather image for a geographical region. The template and target weather images include values of a meteorological parameter according to location in the geographical region at a first time and a second time, respectively. The processor module is in communication with the input module and includes a deformation module and an advection module. The deformation module is configured to determine a displacement field based on a plurality of values of modes of motion. Each value of a mode of motion is determined by an iterative application of a unique spectral filter to a gradient error image calculated from an iteratively deformed template weather image and the target weather image. The advection module is configured to determine an advection field based on the values of the modes of motion for each of the spectral filters and to apply the advection field to a weather image to thereby generate a forecast weather image.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

The invention relates to a method and an apparatus for generating a forecast weather image. The method is based on the application of a cascaded field alignment technique to the processing of weather images such as weather radar images. By way of example, a weather radar image may include values for a vertically integrated liquid (VIL) field. Field alignment is achieved by displacing the coordinates of an image (i.e., a template image) to reduce or minimize a measure of dissimilarity between the image and another image (i.e., a target image). The displacement of a coordinate in the template image is specified by a vector for that coordinate. The array of displacement vectors describes a vector field that is referred to as a displacement field or a deformation field. In meteorological applications, the displacement field is sometimes referred to as an advection field. The displacement field is the solution to a process that attempts to reduce or minimize the error between the template and target images.

Though described below as a method and an apparatus, it will be appreciated by one skilled in the art that aspects of the present invention may also be embodied as a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In the context of this document, a computer readable storage medium may be any tangible medium that can contain, or store a program for use by or in connection with an instruction execution system, apparatus, or device. A computer readable signal medium may include a propagated data signal with computer readable program code embodied therein. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Embodiments of the method of the invention are based on the application of filters to approximate viscous alignment and to thereby achieve displacement fields having meaningful structure. In various embodiments a power-law energy spectrum is utilized for addressing deformations in the displacement field through the application of a set of Gabor filters that approximates a power law. Thus the method generally avoids problems that would otherwise arise from discontinuities present in track vector fields generated by cross-correlation image processing techniques. In the various embodiments described below, the weather images are generally referred to as weather radar images; however, it will be recognized that the method can be performed with other types of weather images that include image data that may be generated or obtained without the use of radar. For example, other types of weather images include satellite irradiance images, infrared sounding images and hyperspectral images.

Figure 1:
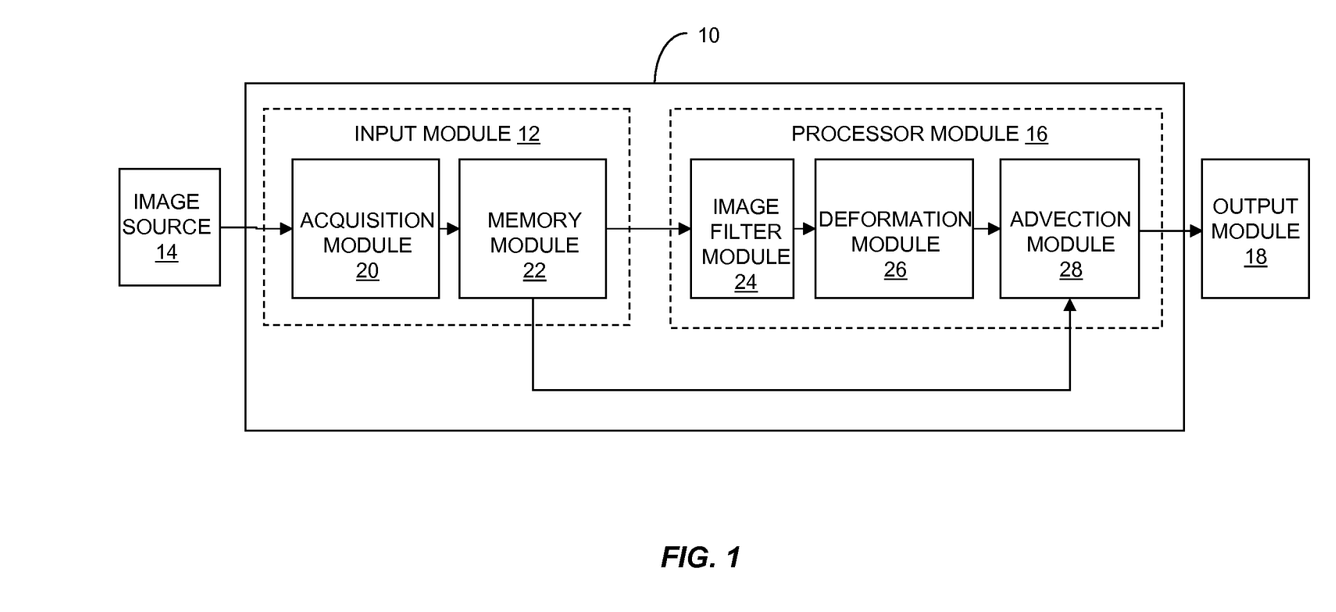
FIG. 1 is a block diagram of an embodiment of an apparatus for generating a forecast weather image according to the invention.

Referring to the functional block diagram of FIG. 1, an apparatus 10 for generating a forecast weather image includes an input module 12 and a processor module 16. The input module 12 receives weather radar image data from a weather radar image source 14. The input module 12 provides the image data to the processor module 16 which generates a forecast weather radar image available at an output module 18. The forecast weather radar image at the output module 18 may be provided as data that can be stored, transmitted or further processed. The output module 18 may include a display for graphical presentation of the forecast weather radar image to a user.

The input module 12 includes an acquisition module 20 and a memory module 22 to receive and store weather radar images for processing by the processor module 16. The acquisition module 20 initiates transfer of weather radar images from the image source 14 (e.g., remote computer system, satellite receiver and processor, Internet server or other device capable of transmitting weather radar images). The memory module 22 is any device capable of temporary or permanent storage of the weather radar image data.

The processor module 16 includes an optional image filter module 24, a deformation module 26 and an advection module 28. The image filter module 24 receives multiple weather radar images from the memory module 22 and applies one or more image filters to the image data. Each image filter is matched to the structures of an organized storm and or other weather feature. The output of the image filter module 24 includes filtered weather radar images. The deformation module 26 determines a displacement field that corresponds to the difference between a template weather radar image obtained for an earlier time and a target weather radar image obtained for a later time. The advection module 28 applies the determined displacement field to one of the received weather radar images stored in the memory module 22 to generate the forecast weather radar image. In preferred embodiments, the determined displacement field is applied to a last acquired weather radar image to thereby generate the predicted weather radar image. Alternatively, the determined displacement field can be applied to other weather radar images such as an image derived by averaging a sequence of images. In some embodiments, the determined displacement field is applied to a weather radar image that has been spatially filtered to emphasize organized storms or other weather features, or to remove high spatial frequency features in the image.

Figure 2:
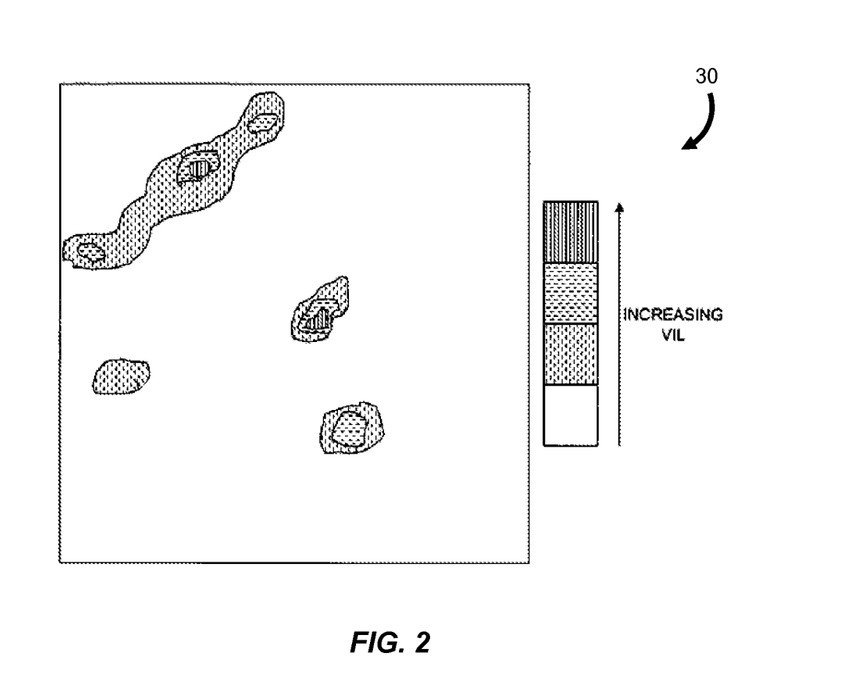
FIG. 2 is an illustration of an example of a template weather radar image.
Figure 3:
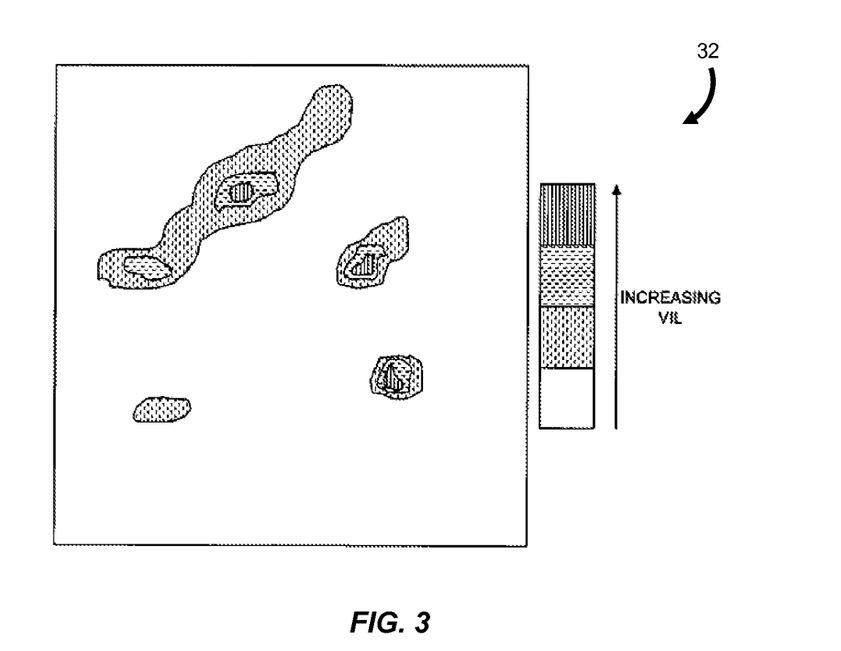
FIG. 3 is an illustration of an example of a target weather radar image acquired at a time after the acquisition of the template weather radar image of FIG. 2.

The received weather radar images include a value of a meteorological parameter for each grid point in the image. For example, the numerical values can be raw radar reflectivity values or can be values derived by processing the radar reflectivity values. For example, the values can be intensity values for vertical integrated liquid (VIL) as shown, for example, by the template weather radar image 30 of FIG. 2 in which the VIL value for each grid point is graphically represented in one of four ranges of VIL values. FIG. 3 shows an example of a target weather radar image 32 acquired at a time after the acquisition of the template weather radar image 30 of FIG. 2. The general motion of the weather features between the image times is from left to right and the shapes and intensities associated with the features change during the intervening time.

According to various embodiments of the method for generating a forecast weather image, a displacement field that deforms the template weather radar image 30 into the target weather radar image 32 is determined. The displacement field is calculated based on application of a Green's function to a gradient error image where the Green's function includes smoothness and non-divergence as constraints. Advantageously, the Green's function can be expressed as a sum of Gabor filters that follows a power law and thus expresses the smoothness constraint. As described in embodiments below, each filter in a bank of Gabor filters is used in a sequential manner starting from a first Gabor filter at zero frequency and subsequently utilizing Gabor filters at increasingly greater frequencies. Each Gabor filter is applied in an iterative manner to determine a value for a mode of motion that approximately minimizes the gradient error. The template weather radar image 30 is then deformed using a displacement field corresponding to the mode of motion and scaled according to the value. Subsequent Gabor filters are applied in a similar manner to the deformed template image resulting from application of the last applied Gabor filter.

Figure 4:
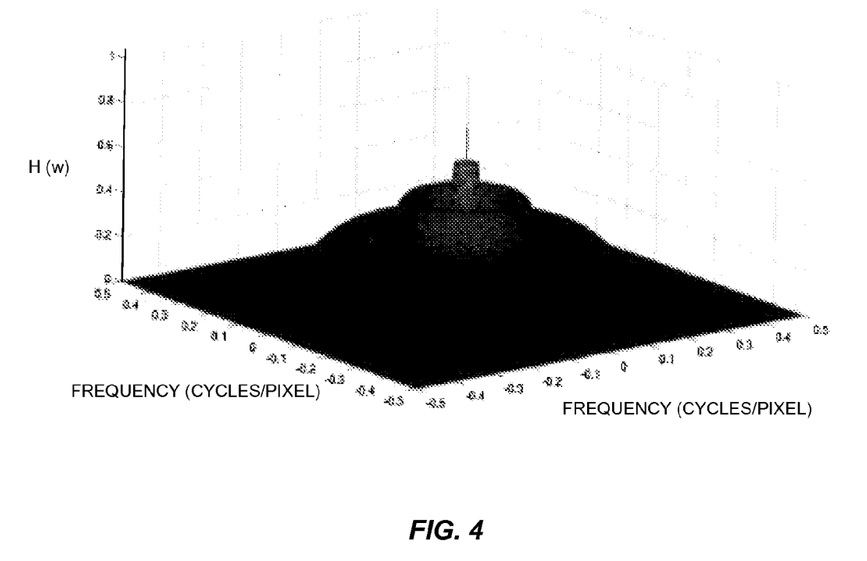
FIG. 4 is a three-dimensional graphical presentation of the sum of a plurality of Gabor filters that approximates a power law distribution.
Figure 5:
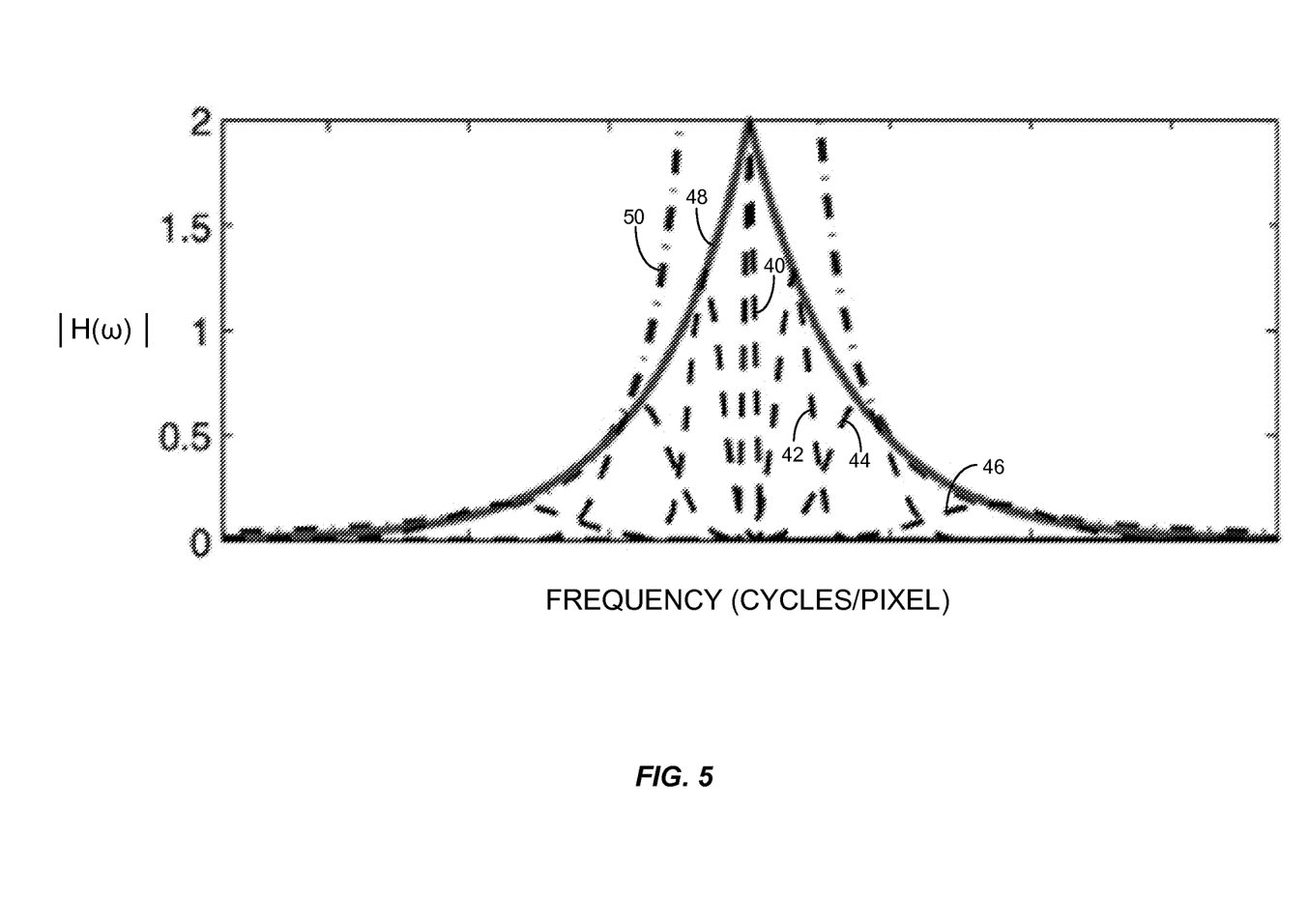
FIG. 5 is a cross-sectional view of the sum of the Gabor filters shown in FIG. 4.

FIG. 4 is a three-dimensional representation of the sum of a plurality of Gabor filters. FIG. 5 is a cross-sectional view of the sum of the Gabor filters shown in FIG. 4 where the dashed lines depict the different Gabor filters. The first Gabor filter is a Gaussian 40 having a center frequency of zero. Each higher order Gabor filter is a gaussian ring (e.g., 42, 44, 46) having a unique radius or center frequency that corresponds to a higher wavenumber. Each Gabor filter has a maximum value at its center frequency according to an exponential envelope 48 which approximates a power law 50.

Figure 6:
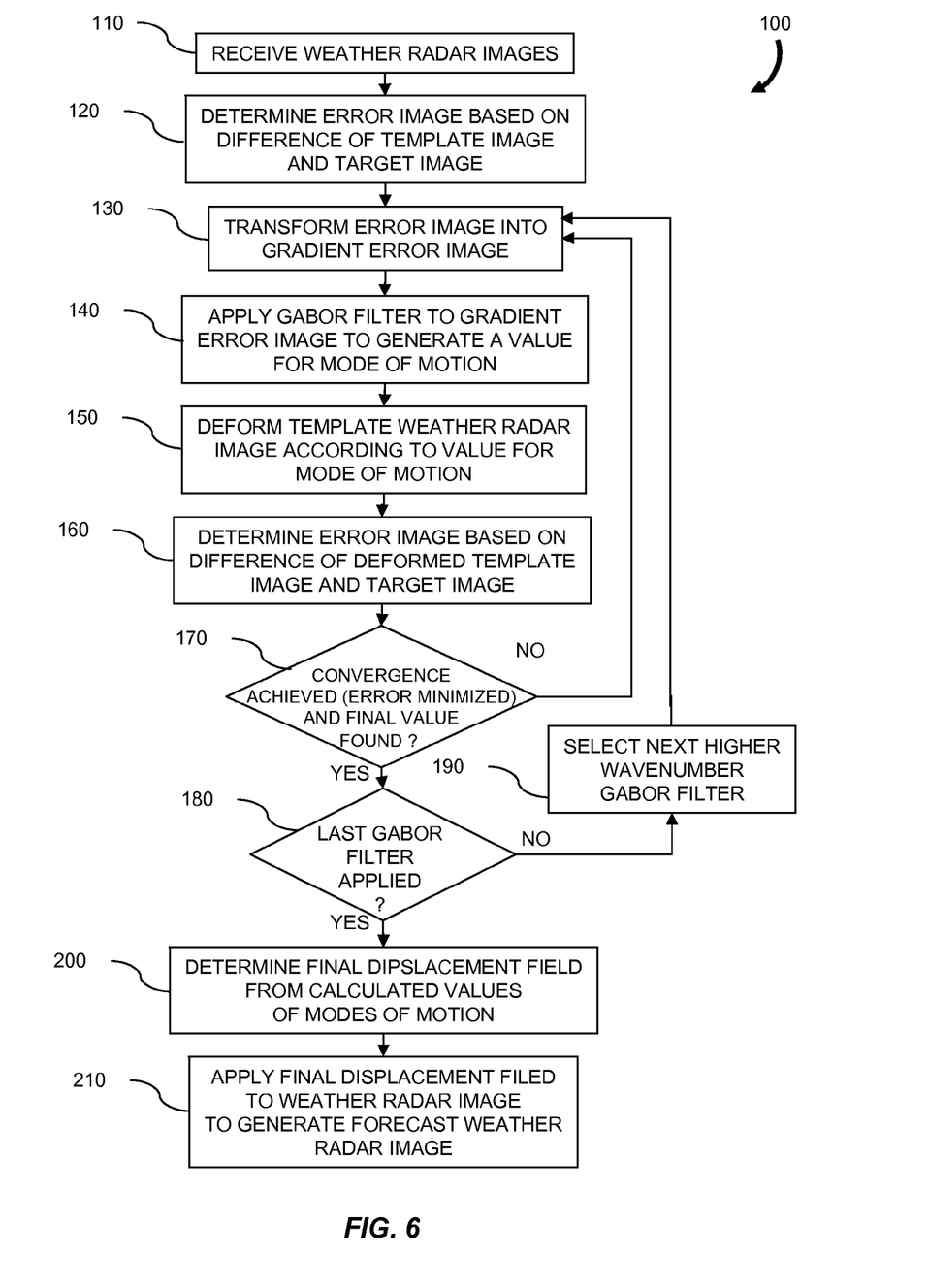
FIG. 6 is a flowchart representation of an embodiment of a method for generating a forecast weather image according to the invention.

FIG. 6 is a flowchart representation of one embodiment of a method 100 for generating a forecast weather image. Weather radar images are received (step 110) from an image provider. In some embodiments, two or more weather radar images may be averaged, for example, by summing a number of consecutively acquired images. Each weather radar image may be pre-filtered using one or more image filters as described, for example, in U.S. Pat. No. 5,959,567. The method 100 continues by determining (step 120) an error image based on a difference of an earlier (template) weather radar image and a later (target) weather radar image. Subsequently, the error image is transformed (step 130) into a gradient error image by multiplying the value at each grid point in the error image by the local spatial gradient present in the template weather radar image. Thus the error image is effectively projected into gradient space.

To solve for the displacement vector field that describes the deformation of the template weather radar image into the target radar weather radar image, the gradient error image is filtered (step 140) using a first Gabor filter having a center frequency of zero to obtain a value for a first mode of motion. For a center frequency of zero (wavenumber zero), the first mode of motion corresponds to a global translation of the template weather radar image. The template weather radar image is then deformed (step 150) for the first mode according to the value and a new error image is determined (step 160) based on a difference of the deformed image and the target image. If the error image does not indicate that convergence is achieved as determined at step 170, the method 100 returns to step 130 and continues through step 170 (where deformation is based on deforming the last deformed image) until convergence is achieved and a final value is determined for the first mode of motion. The final value of the first mode of motion represents the global translation between the template weather radar image and the target weather radar image.

Subsequently, a second Gabor filter having a wavenumber of 0.5 is selected (step 190) and applied to the gradient error image that is calculated based on the template weather radar image deformed according to the first mode of motion and the target weather radar image. Iterative application of the second Gabor filter and deformation is performed until convergence occurs and a final value for the second mode of motion is determined (steps 130 through 170). Additional Gabor filters, each having an increased wavenumber relative to the last applied Gabor filter, are applied and values for higher modes of motion are determined in a similar manner until it is determined (step 180) that all the Gabor filters have been applied.

The method 100 continues at step 200 by determining the final displacement field (i.e., advection field) from the calculated values of the modes of motion. In effect, the displacement fields determined for each mode of motion are summed to generate the final displacement field. The advection field is then applied (step 210) to one of the weather radar images to generate the forecast weather radar image. In preferred embodiments, the advection field is applied to the template weather radar image (e.g., the latest weather radar image) to generate the forecast weather radar image. In one embodiment, the template weather radar image is spatially filtered prior to application of the advection field.

The number of Gabor filters employed in the method 100 can be selected according to a particular application. In various embodiments, the Gabor filters have wavenumbers of 0, 0.5, 1, 2, 4, 8 and so on such that each filter has a wavenumber that is twice the wavenumber of the preceding filter. In various embodiments, the number of Gabor filters is between 8 and 12, inclusive, although this is not a requirement. For example, the particular choice of the number of filters can be limited according to the image size expressed in pixels. In another example, the number of filters used is selected based on the desired modes of motions to be extracted from the images (e.g., rotation and local shear).

This scale-cascaded alignment technique for deforming the template weather radar image to the target weather radar image based on application of the entirety of the Gabor filters can rapidly converge on a solution for the displacement field. Each Gabor filter application captures a different scale of motion and leaves increasingly negligible gradient error images for subsequent higher wavenumber Gabor filters to resolve. Moreover, the lower frequency Gabor filters can accurately capture advection associated with large scale temporally coherent meteorological events that persist over longer durations while less temporally coherent local meteorological events correspond to the more attenuated higher frequency Gabor filters.

While the invention has been shown and described with reference to specific embodiments, it should be understood by those skilled in the art that various changes in form and detail may be made therein without departing from the spirit and scope of the invention.

What is claimed is:

1. A method of generating a forecast weather image, the method comprising:
    (a) receiving a template weather image and a target weather image for a geographical region, the template and target weather images comprising values of a meteorological parameter according to location in the geographical region at a first time and a second time, respectively;
    (b) determining a gradient error based on a difference of the template and target weather images;
    (c) applying a spectral filter to the determined gradient error to generate a value of a mode of motion corresponding to the spectral filter;
    (d) deforming the template weather image according to the value of the mode of motion;
    (e) repeating steps (b) through (d), wherein each repetition of step (b) comprises determining the gradient error based on a difference of a last deformed template weather image and the target weather image, each repetition of step (c) comprises applying a spectral filter having a wavenumber greater than a wavenumber of a last applied spectral filter, and each repetition of step (d) comprises deforming the last deformed template weather image; and
    (f) determining a displacement field based on the values of the modes of motion.

2. The method of claim 1 wherein step (c) comprises iteratively applying the spectral filter to a last determined gradient error to determine the value of the mode of motion corresponding to the spectral filter.

3. The method of claim 1 further comprising applying the displacement field to a weather image to generate a forecast weather image.

4. The method of claim 3 wherein the displacement field is applied to the target weather image.

5. The method of claim 1 wherein the weather images are weather radar images.

6. The method of claim 5 wherein the weather radar images are vertically-integrated liquid images.

7. The method of claim 1 wherein the spectral filters are Gabor filters.

8. The method of claim 1 wherein the spectral filter that is first applied has a wavenumber of zero and describes a global translation mode of motion.

9. The method of claim 1 wherein a sum of the spectral filters approximates a power law.

10. The method of claim 1 wherein at least one of the template weather radar image and the target weather radar image comprises an average of a plurality of weather radar images.

11. A method of generating a forecast weather image, the method comprising:
    (a) receiving a template weather image and a target weather image for a geographical region, the template and target weather images comprising values of a meteorological parameter according to location in the geographical region at a first time and a second time, respectively;
    (b) determining a gradient error based on a difference of the template and target weather images;
    (c) applying a spectral filter to the determined gradient error to generate a value of a mode of motion corresponding to the spectral filter;
    (d) deforming the template weather image according to the value of the mode of motion;
    (e) repeating the steps of (b) through (d), wherein each repetition of step (b) comprises determining the gradient error based on a difference of a last deformed template weather image and the target weather image and wherein step (d) comprises deforming the last deformed template weather image; and
    (f) repeating step (e), wherein each repetition of step (b) according to step (e) comprises determining the gradient error based on a difference of the last deformed weather image and the target weather image, each repetition of step (c) according to step (e) comprises applying a spectral filter having a wavenumber greater than a wavenumber for a last applied spectral filter, and each repetition of step (d) according to step (e) comprises deforming the last deformed template weather image.

12. The method of claim 11 further comprising determining a displacement field based on the values of the modes of motion.

13. The method of claim 12 further comprising applying the displacement field to a weather image to generate a forecast weather image.

14. The method of claim 13 wherein the displacement field is applied to the target weather image.

15. The method of claim 11 wherein the spectral filters are Gabor filters.

16. The method of claim 11 wherein a sum of the spectral filters approximates a power law.

17. An apparatus for generating a forecast weather image, comprising:
    an input module configured to acquire and store a template weather image and a target weather image for a geographical region, the template and target weather images comprising values of a meteorological parameter according to location in the geographical region at a first time and a second time, respectively; and
    a processor module in communication with the input module, the processor module comprising:
        a deformation module configured to determine a displacement field based on a plurality of values of modes of motion, each value of a mode of motion being determined by an iterative application of a spectral filter to a gradient error image calculated from an iteratively deformed template weather image and the target weather image, the spectral filter used in the iterative application with each mode of motion being different from the spectral filters used for the iterative applications with the other modes of motion; and
        an advection module configured to determine an advection field based on the values of the modes of motion for each of the spectral filters and to apply the advection field to a weather image to thereby generate a forecast weather image.

18. The apparatus of claim 17 wherein the spectral filters are Gabor filters.

19. The apparatus of claim 17 wherein the advection module applies the advection field to the target weather image.

20. The apparatus of claim 17 wherein the template weather image and target weather image are weather radar images.

21. The apparatus of claim 20 wherein the weather radar images are vertically-integrated liquid images.

22. The apparatus of claim 17 wherein the processor module further comprises an image filter module configured to apply one or more image filters to the template weather image and the target weather image, each of the image filters predefined to match a weather image feature.

23. A computer program product for generating a forecast weather image, the computer program product comprising:
 a computer-readable storage medium having computer readable program code embodied therewith, the computer readable program code comprising:
  (a) computer readable program code configured to receive a template weather image and a target weather image for a geographical region, the template and target weather images comprising values of a meteorological parameter according to location in the geographical region at a first time and a second time, respectively;
  (b) computer readable program code configured to determine a gradient error based on a difference of the template and target weather images;
  (c) computer readable program code configured to apply a spectral filter to the determined gradient error to generate a value of a mode of motion corresponding to the spectral filter;
  (d) computer readable program code configured to deform the template weather image according to the value of the mode of motion;
  (e) computer readable program code configured to cause a repeat execution of the (b) computer readable program code through the (d) computer readable program code, wherein each repeated execution of the (b) computer readable program code comprises determining the gradient error based on a difference of a last deformed template weather image and the target weather image, each repeated execution of the (c) computer readable program code comprises applying a spectral filter having a wavenumber greater than a wavenumber of a last applied spectral filter, and each repeated execution of the (d) computer readable program code comprises deforming the last deformed template weather image; and
  (f) computer readable program code configured to determine a displacement field based on the values of the modes of motion.

24. The computer program product of claim 23 wherein the (c) computer readable program code is configured to iteratively apply the spectral filter to a last determined gradient error to determine the value of the mode of motion corresponding to the spectral filter.

25. The computer program product of claim 23 wherein the spectral filters are Gabor filters.

26. The computer program product of claim 23 wherein the computer readable storage medium further comprises computer readable program code configured to apply the displacement field to a weather image to generate a forecast weather image.

* * * * *